(12) United States Patent
Kahn

(10) Patent No.: US 10,728,385 B2
(45) Date of Patent: Jul. 28, 2020

(54) SYSTEM AND METHOD FOR RING SUPPRESSION

(71) Applicant: STARLOGIK IP LLC, New York, NY (US)

(72) Inventor: Ari Kahn, Mount Shasta, CA (US)

(73) Assignee: Starlogik IP LLC, Mount Shasta, CA (US)

( * ) Notice: Subject to any disclaimer, the term of this patent is extended or adjusted under 35 U.S.C. 154(b) by 0 days.

(21) Appl. No.: 14/437,502

(22) PCT Filed: Oct. 22, 2013

(86) PCT No.: PCT/IB2013/059540
§ 371 (c)(1),
(2) Date: Apr. 22, 2015

(87) PCT Pub. No.: WO2014/064611
PCT Pub. Date: May 1, 2014

(65) Prior Publication Data
US 2015/0288816 A1 Oct. 8, 2015

Related U.S. Application Data

(60) Provisional application No. 61/716,771, filed on Oct. 22, 2012.

(51) Int. Cl.
*H04M 3/436* (2006.01)
*H04M 1/57* (2006.01)
(Continued)

(52) U.S. Cl.
CPC ......... *H04M 3/436* (2013.01); *H04M 1/573* (2013.01); *H04M 1/575* (2013.01);
(Continued)

(58) Field of Classification Search
CPC .......... H04M 3/436; H04M 1/56; H04W 4/16
(Continued)

(56) References Cited

U.S. PATENT DOCUMENTS 7,352,854 B1 * 4/2008 Silver ................. H04M 3/4288
379/207.16
2001/0055376 A1 * 12/2001 Karas ..................... H04M 1/57
379/142.02
(Continued)

OTHER PUBLICATIONS

"Art of the iPhone", https://web.archive.org/web/20120926220138/ http://artoftheiphone.com/2012/09/25/tip-how-to-allow . . . (9 pages).
(Continued)

*Primary Examiner* — Jinsong Hu
*Assistant Examiner* — Farideh Madani
(74) *Attorney, Agent, or Firm* — Dinsmore & Shohl LLP

(57) ABSTRACT

A system for ring suppression facilitates notification and handling of unwanted calls as desired by a recipient, and in particular without disturbing the recipient. A new social dimension of call presentation logic is now available to callers. A telephony device is configured to receive an incoming call. The incoming call includes a calling line identity (CLI). On the telephony device, individual contacts in an address book are searched for a match to the CLI. If a match is found, a first phone action is activated (such as ringing the phone). If a match is not found in the address book for the incoming CLI, a second phone action is activated (such as not ringing the phone, and displaying the CLI). In other words, a call that is not in the address book of the recipient (B party) is silenced.

16 Claims, 2 Drawing Sheets

(51) Int. Cl.
*H04M 3/42* (2006.01)
*H04W 4/12* (2009.01)
*H04W 4/16* (2009.01)
*H04M 19/04* (2006.01)

(52) U.S. Cl.
CPC ......... *H04M 3/42059* (2013.01); *H04W 4/12* (2013.01); *H04W 4/16* (2013.01); *H04M 19/047* (2013.01); *H04M 19/048* (2013.01)

(58) Field of Classification Search
USPC .......... 455/415, 418; 379/142.06, 88.21, 245
See application file for complete search history.

(56) References Cited

U.S. PATENT DOCUMENTS

| | | | |
|---|---|---|---|
| 2002/0018546 A1* | 2/2002 | Horne | H04M 1/663 379/142.06 |
| 2002/0196913 A1 | 12/2002 | Ruckart | |
| 2003/0054864 A1* | 3/2003 | Mergler | H04M 1/2745 455/566 |
| 2003/0059023 A1 | 3/2003 | Crockett | |
| 2005/0117730 A1* | 6/2005 | Mullis | H04M 3/54 379/210.02 |
| 2006/0121887 A1* | 6/2006 | Chilukoor | H04M 3/436 455/412.2 |
| 2008/0049911 A1* | 2/2008 | Hanson | H04M 3/53333 379/88.22 |
| 2011/0211572 A1* | 9/2011 | Campion | H04L 12/66 370/352 |

OTHER PUBLICATIONS

"Use Do Not Disturb on your iPhone, iPad, and iPod touch", https://discussions.apple.com/thread/4380349 (3 pages).

Bohn, Dieter, "iOS 6 to feature 'Do Not Disturb' setting, 'Reply with message' feature for calls", https://www.theverge.com/2012/6/11/3078500/apple-wwdc-ios-6-do-not-disturb (3 pages).

* cited by examiner

SYSTEM AND METHOD FOR RING SUPPRESSION

CROSS-REFERENCE TO RELATED APPLICATIONS

This application claims the benefit of US provisional patent application (PPA) Ser. No. 61/716,771 Oct. 22, 2012 by the present inventor, which is incorporated by reference.

FIELD OF THE INVENTION

The present invention generally relates to the field of communications, and in particular, it concerns notification of telephony calls.

BACKGROUND OF THE INVENTION

A continuing problem in the current modern world of telephony communications is receiving unwanted calls. Existing solutions, such as national "do not call" registries, prevent unwanted calls from being presented to the recipient. That is, the call is blocked in the network, and the recipient is unaware of the attempted call. In addition, "do not call" registries require users to "opt in" to the registry, and calling control is at the source (origination) of the call.

Another existing solution is creating "contact groups", where a received call from any member of a contact group of callers is handled according to a configuration for that contact group. This technique requires that every desired contact is entered into the appropriate contact groups, and every new contact must also be added to all of the appropriate contact groups to achieve a desired configuration and call behavior.

There is therefore a need for a more seamless system and method to provide notification and handling of unwanted calls without disturbing the recipient.

SUMMARY

According to the teachings of the present embodiment there is provided a system including: a telephony device configured to: receive an incoming call, the incoming call including a calling line identity (CLI); and search individual contacts in an address book associated with the telephony device for a match to the CLI, and if the match is found, activate a first phone action; and if the search fails to find the match, activate a second phone action.

According to the teachings of the present embodiment there is provided a method including the steps of: receiving, at a telephony device, an incoming call, the incoming call including a calling line identity (CLI); and searching individual contacts in an address book associated with the telephony device for a match to the CLI, and if the match is found, activate a first phone action; and if the search fails to find the match, activate a second phone action.

In an optional embodiment, the first phone action is selected from the group consisting of audible tone; activation of a visible indicator; and flash screen.

In an optional embodiment, the second phone action is selected from the group consisting of: silence; displaying the CLI; vibrate phone; and forward to voice mail.

In an optional embodiment, the first phone action is distinct from the second phone action.

In an optional embodiment, the telephony device is a cellular phone.

In an optional embodiment, the incoming call originates from a device selected from the group consisting of: a VoIP phone; and a telephony application.

In an optional embodiment, the telephony device is associated with a called party.

In an optional embodiment, the CLI is associated with a calling party.

According to the teachings of the present embodiment there is provided a computer-readable storage medium having embedded thereon computer-readable code for handling a received call, the computer-readable code including program code for: receiving, at a telephony device, an incoming call, the incoming call including a calling line identity (CLI); and searching individual contacts in an address book associated with the telephony device for a match to the CLI, and if the match is found, activate a first phone action; and if the search fails to find the match, activate a second phone action.

According to the teachings of the present embodiment there is provided a computer program that can be loaded onto a server connected through a network to a client computer, so that the server running the computer program constitutes a server in a system according to any one of the above claims.

According to the teachings of the present embodiment there is provided a computer program that can be loaded onto a computer connected through a network to a server, so that the computer running the computer program constitutes a client computer in a system according to any one of the above claims.

BRIEF DESCRIPTION OF FIGURES

The embodiment is herein described, by way of example only, with reference to the accompanying drawings, wherein.

DETAILED DESCRIPTION

FIGS. 1 to 4

Figure 1:
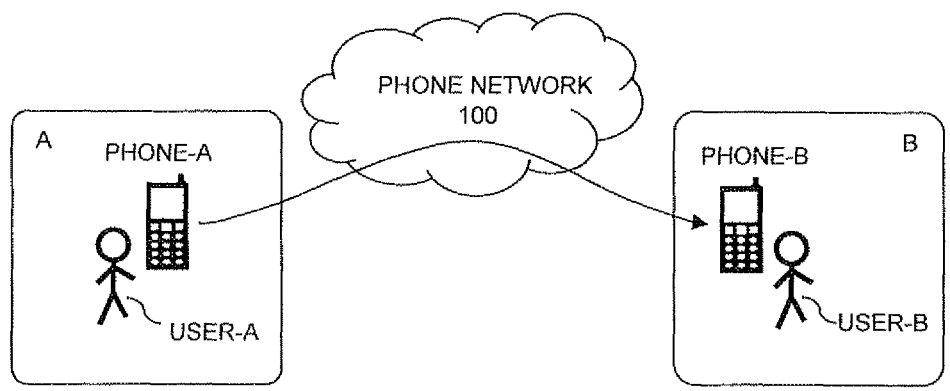
FIG. 1 is a general, high-level diagram of telephony communications supporting the current embodiment.

The principles and operation of the system and method according to a present embodiment may be better understood with reference to the drawings and the accompanying description. A present invention is a system for ring suppression. The system facilitates notification and handling of unwanted calls as desired by a recipient, and in particular without disturbing the recipient.

In general, an embodiment includes a telephony device configured to receive an incoming call. The incoming call includes a calling line identity (CLI). On the telephony device, individual contacts in an address book are searched for a match to the CLI. If a match is found, a first phone action is activated (such as ringing the phone). If a match is not found in the address book for the incoming CLI, a second phone action is activated (such as not ringing the phone, and displaying the CLI). In other words, a call that is not in the address book of the recipient (B party) is silenced.

Conventional solutions, such as "do not call" lists, prevent unwanted calls from being presented to a user (recipient). In contrast, an embodiment of this invention can be used to prevent unwanted calls from disturbing a user. Another significant drawback of conventional solutions is that conventional solutions require a user to "opt in", or individually configure each contact, in particular each new contact in the user's address book. In contrast, an embodiment of the current invention provides an innovative built-in feature for handling unwanted calls and also provides a feature for handling new address book contacts without the need for a user to configure individually the user's phone to handle the new contact. In addition, whereas conventional solutions place calling control at the source (calling party and/or network), the current embodiment gives the recipient call control at the destination.

The current embodiment provides an innovative "social dimension" including call presentation logic on the terminal. The social logic disclosed herein applies to the "relationship that naturally exists between A and B" in order to impart "context to the ring". Since B governs the relationship with A (that is B determines which A is recorded in B's address book) and since by default any "new caller" is not recorded in the B address book, unwanted calls (such as robo-calls) are automatically silenced. Even if robo-callers change calling identity, robo-callers cannot change the recorded AB relationship, and therefore cannot alert through ringing B's phone. This solution can be implemented via a software modification (or as hardware/firmware modifications) to existing call presentation managers on telephones. This modification can be enabled and distributed by mobile operating system (O/S) providers and handset vendors since substantially all telephony operating systems attempt to match an incoming CLI (caller) to a named contact in the callee address book. Significantly "silencing the ring" is non-destructive, in that this solution can universally present all callers, however only alerting (ringing) when the caller is "known and recorded in the callee address book". This feature results in legitimate "unknown callers" being silenced rather than "denied access", placing complete call control and ring presentation in the hands of the recipient (consumer). Unwanted calls can still be presented to the recipient, however unwanted calls do not disturb (DND) the recipient.

Referring now to the drawings, FIG. 1 is a general, high-level diagram of telephony communications supporting the current embodiment. One skilled in the art will realize the drawings and examples are simplified for clarity and typical cases and terminology are used. However, the examples used in the current description should not be considered limiting, and based on this description one skilled in the art will be able to implement an embodiment of the current invention to meet desired specific requirements and applications.

UserA having associated telephony device PhoneA calls UserB having associated telephony device PhoneB via network 100. In general, the callpath is described from A to B, or A→B. UserA is the caller, calling party, or sender, with PhoneA being the calling phone and having an associated calling number (caller's number). UserB is the recipient, also referred to as the receiver, called party consumer, or user. As is common in the industry, a distinction may not be made between the user and phone when referring to "A" and "B".

PhoneA can be one of a variety of devices, including include cellular phones, VoIP phones, telephony applications running on processors (such as software applications running on a user's computer or Smartphone), and landline phones. Typically, PhoneB, the telephony device of UserB is a cellular phone. PhoneB is able to receive calling line identity (CLI), such as "caller-id", and includes an address book function. The actual telephony device used by a user is also referred to as a handset.

Calling line identity (CLI) is also known as caller ID (caller identification, CID), calling line identification (CLID), calling number delivery (CND), calling number identification (CNID) and calling line identification presentation (CLIP). CLI is a telephone service, available in analog and digital phone systems and most voice over Internet Protocol (VoIP) applications, which transmit a caller's number to the called party's telephone.

Figure 2:
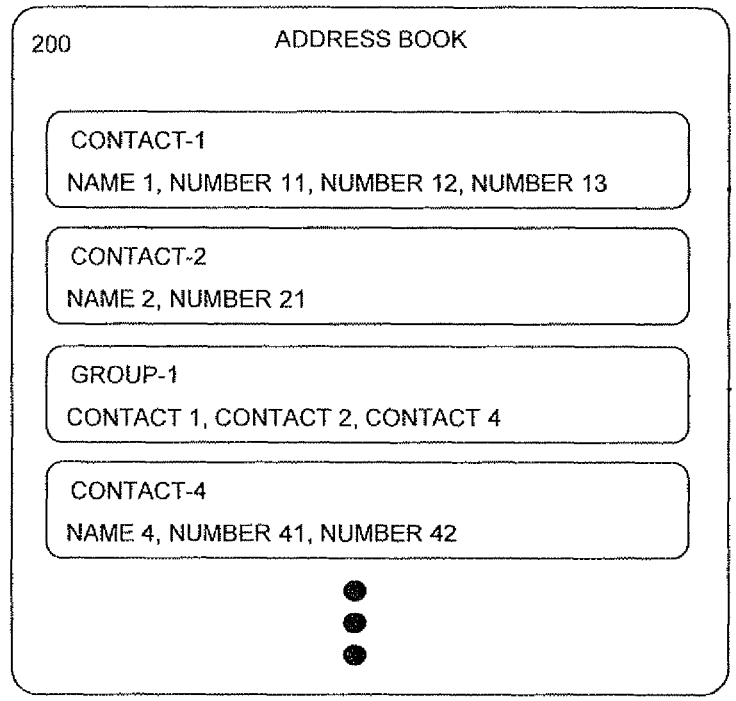
FIG. 2 is a sketch of an exemplary address book.

Referring again to the drawings, FIG. 2 is a sketch of an exemplary address book 200. Address books are known by other names, depending on the manufacturer, including "names" and "contacts". For simplicity and consistency in this document, the term "address book" is used to refer to this data structure and/or feature. An address book may have (support) various entries. The address book 200 is shown with two types of typical entries: Individual contacts and contact groups. In the context of this document, the term "individual contact" generally refers to an entry for a single calling party (one person, one calling party). Individual contacts may have one or more associated telephone numbers (or simply "numbers"), and other information (such as name, street address, photograph, etc.). Some address books also support contact groups. In the context of this document, the term "contact group" generally refers to a reference to more than one calling party (more than one person). Note that a contact group can have a single entry.

The address book 200 has exemplary entries contact-1, contact-2, group-1, and contact-4. Contact-1 is an example of an individual contact having name1 and three associated telephone numbers number11, number12, and number13. Contact-2 is an example of an individual contact having name2 and one associated telephone number number21. Group-1 is an example of a contact group having three associated contacts: contact-1, contact-2, and contact-3. Contact-4 is an example of an individual contact having name4 and two associated telephone numbers number41, number42.

In the context of this document, the term "unwanted calls" generally includes calls received by a recipient that the recipient does not want to pay attention to at the time the call is received. Unwanted calls can include unsolicited or unscheduled calls from strangers and "Robo-calling". Robo-calling (robotic-calling) includes calls from an automated system that plays a pre-recorded message. Robo-callers can easily mask and modify the robo-caller's caller identity (such as CLI). Unwanted calls are characterized by the phone number of the unwanted call not being in the recipient's address book. In other words, an unwanted call has an associated calling number (CLI) that fails to appear in an address book of a called party (recipient).

Figure 3:
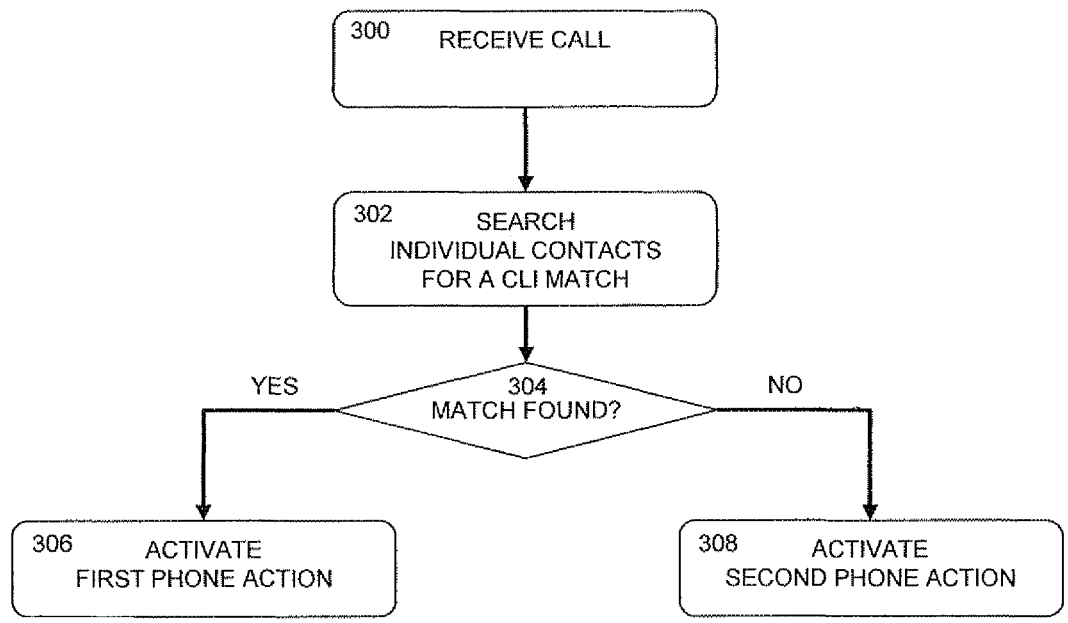
FIG. 3 is a flowchart of an embodiment for notification and handling of unwanted calls as desired by a recipient.

Referring to the drawings, FIG. 3 is a flowchart of an embodiment for notification and handling of unwanted calls as desired by a recipient. A telephony device (PhoneB) is configured to receive 300 an incoming call from a calling party (PhoneA). The incoming call includes an associated calling line identity (CLI), the CLI corresponding to the calling party (UserA). Individual contacts in an address book associated with the telephony device are searched 302 for a match to the CLI. If a match is found for the CLI in the address book, the method continues from block 304 to block 306 and a first phone action is activated on the telephony device (PhoneB). If a match is not found (in other words, the search fails to find a match) for the CLI in the address book, the method continues from block 304 to block 308 and a second phone action is activated on the telephony device. In other words, unwanted calls are not found in the recipient's address book, and activate a second phone action, while wanted calls are found in the recipient's address book and activate a first phone action. Ring suppression is automatically applied to received calls whenever a received call is not in the user's address book, and whenever a user adds a new contact to the address book then ringing is automatically permitted.

A significant feature of the current method is that matching of a received CLI is done with all of the contacts in an address book. In other words, all of the individual contacts in an address book are searched for a match with the received CLI. The search 302 is to match any contact, as opposed to conventional ringing that can be set for contacts and contact groups. This feature facilitates presentation and DND functions on a user's phone, without requiring the user to configure individually each contact, in particular each new contact in the recipient's address book.

In a case where the calling number is private, the CLI of the calling party is not sent to PhoneB, the telephony device of the recipient, so the incoming CLI is not matched to the recipient's address book, and the second phone action is activated.

The first phone action can include a variety of implementations on the recipient's phone, including, but not limited to:
 ringing;
 audible tone;
 activation of a visible indicator; and
 flash screen.

The second phone action can include a variety of implementations on the recipient's phone, including, but not limited to:
 silence;
 vibrate;
 tonal alerts;
 forward to voice mail; and
 displaying the CLI.

While ringing is well understood to describe a repetitive audible emission to alert the callee, in alternative embodiments a non-repetitive, short duration sound or a single short duration tone can be emitted (collectively known as "tonal alerts").

In general, the first phone action is distinct from the second phone action. Where the first phone action is intended to get the recipient's attention, the second phone action is chosen as to not interrupt the recipient. The second phone action can also be thought of as a "non-action". Normally, the incoming CLI is displayed as at least a part of the second phone action.

Conventional techniques for "silencing" an individual contact is to either exclude the contact from a ringing group or apply a "blank" (silent) recorded ringing tone, that is a ringing tone that has no audio. "Selecting an individual contact to silence" is distinct from "selecting an individual contact to ring" or excluding an individual contact from a ringing group and thereby silently receiving of an individual contact. This is an inverse operation as "silencing individually" exceptions a contact from the presently disclosed "default ring all contacts in address book".

The second phone action corresponds to a DND function implementing "silencing the ring" and call screening functionality. Second phone action (such as call screening functionality) may be provided by a recipient's phone to deliver the disclosed DND functionality, including without limitation an ability to flag a recorded contact as a "silent caller". In a preferred embodiment, "silencing the ring", describes presenting an incoming call without audible alerting, that is without ringing the telephony device (a preferred option in activating a second phone action). Typically, this results in the telephony device visually displaying the incoming call. Visually displaying the incoming call includes visually displaying the calling phone number (CLI) and or name associated with the CLI or with a contact in the recipient's address book, when such information is available. Visually displaying the incoming call may further include "visual display effects" such as variable lighting effects, including without limitation, "flashing" the caller information on and off the telephony display and displaying variable colors.

In further embodiments, silencing the ring may result in vibrating the device, which results in a humming or buzzing tone, and in further embodiments, combinations of tonal and visual effects. Tonal alerts such as emitting a short duration sound or a single short duration tone.

Alternative visual and/or tonal alerts may be automatically applied when a method of the current embodiment is invoked. Alternatively, visual and tonal alerts may be applied on callee selection. Further, visual and or tonal alerts may be determined from settings that are currently in effect on the telephony device that describe "silent mode", such as an existing profile or configuration on the recipient's phone.

Figure 4:
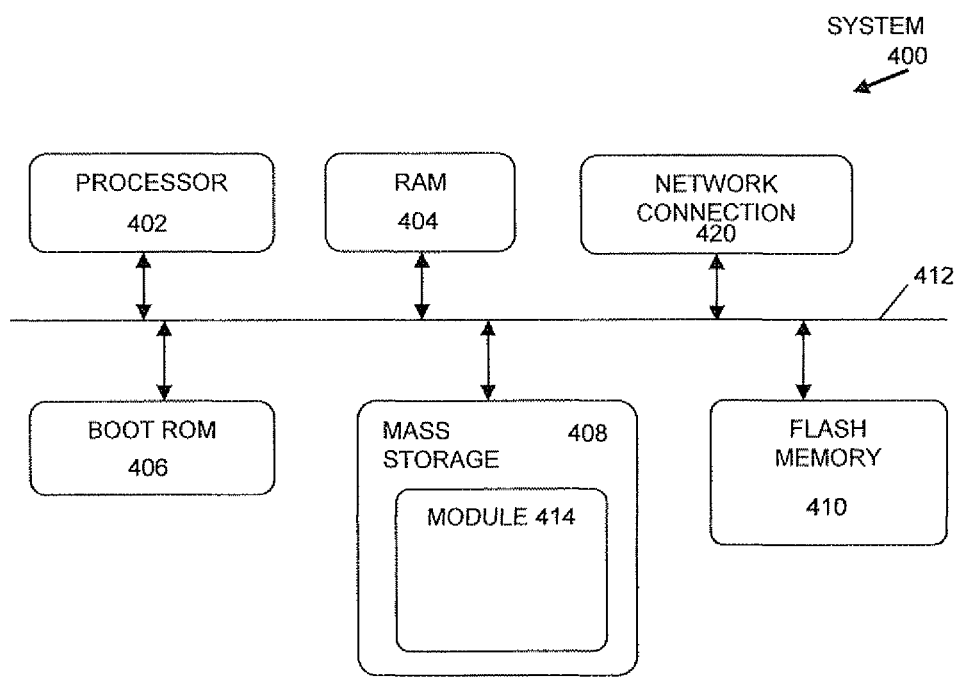
FIG. 4 is a high-level partial block diagram of an exemplary system configured to implement telephony device of the present invention.

Refer now to the drawings, FIG. 4 is a high-level partial block diagram of an exemplary system 400 configured to implement telephony device (PhoneB) of the present embodiment. System (processing system) 400 includes a processor 402 (one or more) and four exemplary memory devices: a RAM 404, a boot ROM 406, a mass storage device (hard disk) 408, and a flash memory 410, all communicating via a common bus 412. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 402 including but not limited to reduced instruction set computer (RISC) architecture and/or complex instruction set computer (CISC) architecture. A module (processing module) 414 is shown on mass storage 408, but as will be obvious to one skilled in the art, could be located on any of the memory devices.

Mass storage device 408 is a non-limiting example of a computer-readable storage medium bearing computer-readable code for implementing the telephony device (PhoneB) methodology described herein. Other examples of such computer-readable storage media include read-only memories such as CDs bearing such code.

System 400 may have an operating system stored on the memory devices, the ROM may include boot code for the system, and the processor may be configured for executing the boot code to load the operating system to RAM 404, executing the operating system to copy computer-readable code to RAM 404 and execute the code.

Network connection 420 provides communications to and from system 400. Typically, a single network connection provides one or more links, including virtual connections, to other devices on local and/or remote networks. Alternatively, system 400 can include more than one network connection (not shown), each network connection providing one or more links to other devices and/or networks.

System 400 can be implemented as a server or client respectively connected through a network to a client or server.

Conventional user phones (called phone B) permit users to control call presentation individually or in groups. For example by allowing the recipient (callee) to selectively permit certain callers to ring and silencing other callers by exclusion (that is not selecting certain callers to ring). In conventional solutions, callers may further be assigned "distinct ringing tones" and phones may be automatically set to switch profiles based on other factors such as "time of day". For example, at a pre-designated time the phone may automatically switch to "silent mode" for a specified time interval.

Rather than selectively presenting the ring based on administered caller profiles, a current embodiment facilitates users now unconditionally silencing calls on a universal exception. This universal exception being the caller is not recorded as a contact in the callee address book. Beyond the "do not disturb" DND aspect related to unwanted callers, a DND function can be applied to any caller who is not currently in the callee address book.

The choices used to assist in the description of this embodiment should not detract from the validity and utility of the invention. It is foreseen that more general choices including, but not limited to types of telephony devices, and types and implementations of address books can be used.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

To the extent that the appended claims have been drafted without multiple dependencies, this has been done only to accommodate formal requirements in jurisdictions that do not allow such multiple dependencies. It should be noted that all possible combinations of features that would be implied by rendering the claims multiply dependent are explicitly envisaged and should be considered part of the invention.

Note that the above-described examples, numbers used, and exemplary calculations are to assist in the description of this embodiment. Inadvertent typographical and mathematical errors do not detract from the utility and basic advantages of the invention.

It will be appreciated that the above descriptions are intended only to serve as examples, and that many other embodiments are possible within the scope of the present invention as defined in the appended claims.

What is claimed is:

1. A system, comprising: a telephony device configured to: receive an incoming call that includes a calling line identity (CLI); search contacts in an address book stored on the telephony device for a match to the CLI; programmatically suppress ringing when the search fans to find the match, thereby preventing the ringing upon the receipt of the incoming call which would otherwise occur without being programmatically suppressed by the telephony device; and continue to present the CLI of the incoming call on a telephony display of the telephony device, thereby permitting a recipient of the incoming call to view the CLI, without ringing.

2. The system of claim 1, wherein the telephony device is further configured to activate, when the search fails to find the match, a phone action that is chosen from:
vibrating the telephony device and
forwarding the call to voice mail.

3. The system of claim 1, wherein the telephony device is a cellular phone.

4. The system of claim 1, wherein the incoming call originates from a device that is chosen from:
a voice over Internet Protocol phone and
a telephony application.

5. The system of claim 1, wherein the telephony device is associated with a called party.

6. The system of claim 1, wherein the CLI is associated with a calling party.

7. A method, comprising steps of: receiving, by a telephony device, an incoming call that includes a calling line identity (CLI); searching, by the telephony device, contacts in an address book stored on the telephony device for a match to the CLI; programmatically suppressing, by the telephony device, ringing when the search fails to find the match, thereby preventing the ringing upon the receipt of the incoming call which would otherwise occur without being programmatically suppressed by the telephony device; and continuing, by the telephony device, to present the CLI of the incoming call on a telephony display of the telephony device, thereby permitting a recipient of the incoming call to view the CLI, without ringing.

8. The method of claim 7, further comprising: activating, by the telephony device, when the search fans to find the match, a phone action that is chosen from: vibrating the telephony device and forwarding the incoming call to voice mail.

9. The method of claim 7, wherein the telephony device is a cellular phone.

10. The method of claim 7, wherein the incoming call originates from a device that is chosen from:
a voice over internet protocol phone and
a telephony application.

11. The method of claim 7, wherein the telephony device is associated with a called party.

12. The method of claim 7, wherein the CLI is associated with a calling party.

13. A non-transitory computer-readable storage medium, comprising: computer-readable code; wherein the non-transitory computer-readable storage medium resides on a telephony device; wherein the computer-readable code, when executed by the telephony device, causes the telephony device to: receive an incoming call; wherein the incoming call includes a calling line identity (CLI); search contacts in an address book stored on the telephony device for a match to the CLI; programmatically suppress ringing when the search fails to find the match, thereby preventing the ringing upon the receipt of the incoming call which would otherwise occur without being programmatically suppressed by the telephony device; and continue to present the CLI of the incoming call on a telephony display of the telephony device, thereby permitting a recipient of the incoming call to view the CLI, without ringing.

14. The non-transitory computer-readable storage medium of claim 13, wherein the computer-readable code, when executed by the telephony device, further causes the telephony device to activate, when the search fails to find the match, a phone action that is chosen from: vibrating the telephony device and forwarding the incoming call to voice mail.

15. The non-transitory computer-readable storage medium of claim 13, wherein the telephony device is a cellular phone.

16. The non-transitory computer-readable storage medium of claim 13, wherein the incoming call originates from a device that is chosen from: a voice over Internet Protocol phone and a telephony application.

\* \* \* \* \*

UNITED STATES PATENT AND TRADEMARK OFFICE
CERTIFICATE OF CORRECTION

PATENT NO. : 10,728,385 B2  
APPLICATION NO. : 14/437502  
DATED : July 28, 2020  
INVENTOR(S) : Ari Kahn Page 1 of 1

It is certified that error appears in the above-identified patent and that said Letters Patent is hereby corrected as shown below:

On the Title Page

Item (54), delete "SYSTEM AND METHOD FOR RING SUPPRESSION" and insert --A SYSTEM AND METHOD FOR RING SUPPRESSION--, therefor.

In the Specification

In Column 1, Line(s) 1&2, delete "SYSTEM AND METHOD FOR RING SUPPRESSION" and insert --A SYSTEM AND METHOD FOR RING SUPPRESSION--, therefor.

In Column 1, Line(s) 59, after "consisting of", insert --:--.

In the Claims

In Column 7, Line(s) 63, Claim 1, delete "fans" and insert --fails--, therefor.

In Column 8, Line(s) 8, Claim 2, after "the", insert --incoming--.

In Column 8, Line(s) 34, Claim 8, delete "fans" and insert --fails--, therefor.

Signed and Sealed this  
Twenty-sixth Day of January, 2021

Drew Hirshfeld  
*Performing the Functions and Duties of the  
Under Secretary of Commerce for Intellectual Property and  
Director of the United States Patent and Trademark Office*